Sept. 8, 1936.  W. W. PARKER  2,053,627

AGITATING APPARATUS

Filed Dec. 18, 1934

INVENTOR.
William W. Parker

Patented Sept. 8, 1936

2,053,627

UNITED STATES PATENT OFFICE 2,053,627

AGITATING APPARATUS

William W. Parker, Newport News, Va.

Application December 18, 1934, Serial No. 757,984

22 Claims. (Cl. 259—101)

This invention relates to improvements in agitating apparatus as applied to ice cream freezing operations especially adapted to domestic culinary use.

Its objects are to provide means of automatically freezing smooth, palatable ice cream within the freezing compartment of conventional mechanical refrigerators; to accelerate such freezing process; and to provide a structure easily maintained in sanitary condition and of practical adaptation to ordinary domestic culinary service.

These objects are attained by the mechanism set forth in the accompanying drawing in which—

Figure 1:
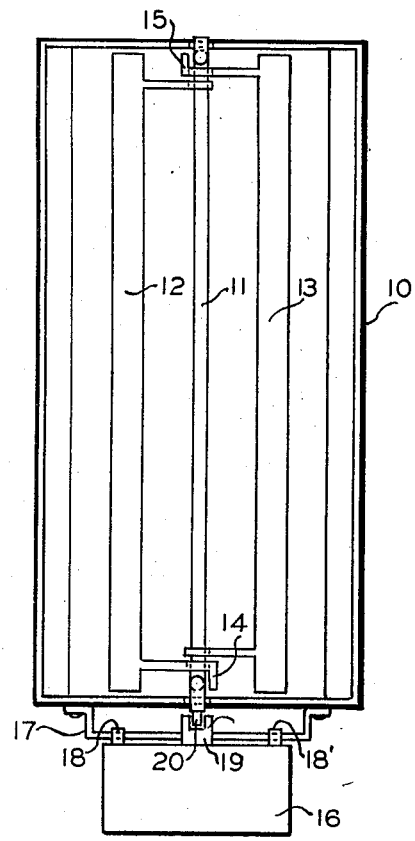
Figure 2:
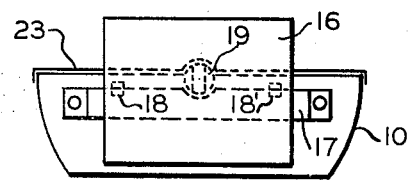
Figure 3:
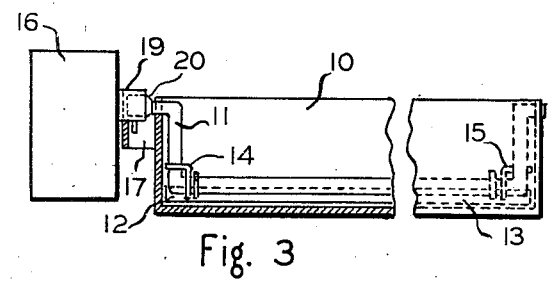
Figure 4:
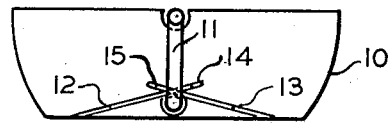

Figure 1 is a plan view; Figure 2 is an end elevation; Figure 3 is a side elevation partly in cross section and with center section broken out; Figure 4 is an end elevation showing the vessel contour with the agitator assembly at rest on a common center line; Figures 5, 6, 7, and 8 are end elevation views showing the vessel contour with agitator assembly diagrammatically indicated at various positions of stroke.

Similar numerals refer to similar parts throughout the several views.

Referring to Figures 1, 2, and 3, there will be observed first, a tray shaped vessel 10 with bottom in plane section and radiused sides; second, an agitator assembly 11, 12, 13 comprising the elongated U-shaped member 11 to which are attached freely hinged scrapers 12 and 13, provided with stops 14 and 15 respectively; third, a mechanical power unit 16 removably supported on handle 17 by means of lugs 18 and 18'. The power unit 16 is provided with a slotted stud drive shaft 19 which engages a flattened end section 20 of the U-shaped member 11. In operation, the drive shaft 19 oscillates through an arc sufficient to move the agitator assembly over a range represented in Figure 6 to Figure 8 with Figures 4, 5, and 7 indicating intermediate positions.

Figure 5:
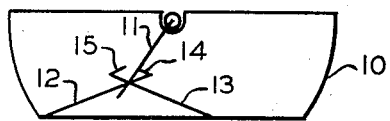
Figure 6:
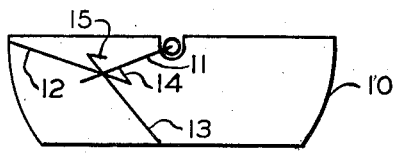

By observing Figures 4 to 8 inclusive, it will be seen that starting from a center position as in Figure 4, the agitator assembly will move clockwise to position Figure 5. Up to this point the scraper 12 has, by its own weight and angular inclination, borne against the bottom of vessel 10. At position Figure 5, the stop 14 comes into contact against U-member 11 and prevents further movement of scraper 12 in relation to member 11. The stroke then continues until position Figure 6 is reached and, since the sides of the vessel are incidental to the fixed operating radius of the agitator assembly during this portion of the stroke, it will be observed that the side has been closely followed to completion of the stroke.

Figure 7:
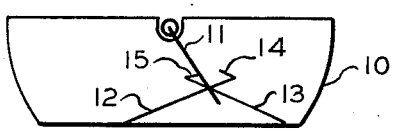
Figure 8:
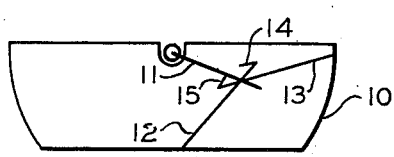

From position Figure 6, the direction reverses to counter-clockwise movement. It will be observed at this point that scraper 13 is at rest slightly to the left of the vessel center line and, as the agitator assembly moves counter-clockwise, scraper 13 actually scrapes the right hand half of the vessel bottom until position Figure 7 is reached, at which point, stop 15 contacts U-member 11 and scraper 13 then follows the radiused side of the vessel to the limit of its stroke as in position Figure 8. Then again reversing direction to clockwise movement it will be observed that scraper 12 is ready for action, scraping the left hand side of the vessel bottom and following the left hand radiused side through a repetition of its previous stroke.

From this sequence of action, it will be seen that the entire contour of the vessel is closely followed by the alternate actions of scrapers 12 and 13, and furthermore, the entire vessel contents are generally agitated by the oscillating motion of the agitator assembly.

The power unit 16 may be of any suitable mechanism to impart a proper oscillating motion and is adapted to be detached and put aside following completion of freezing operations.

A removable tray cover 23 as in Figure 2, is normally used to prevent spillage of contents and to lock power unit 16 into position against accidental removal.

From the foregoing description, it will be readily seen that the objects sought have been completely attained. Therefore, this invention is intended to be generically and specifically included within the range of the following claims.

I claim:

1. A vessel for use in a mechanical refrigerator and having an interior transverse contour of varying radius from fixed longitudinal axis within its confines, and an oscillating agitator operative about said axis, said agitator comprising a member of fixed operating radius, attached members of variable operating radius and adapted to follow the contour of said vessel, said vessel having an external flat bottom surface adapted to be disposed in heat transferring contact with the heat absorbing element of said refrigerator.

2. A vessel for use in a mechanical refrigerator and having an interior transverse contour of varying radius from a fixed longitudinal axis within its confines, and an oscillating agitator operative about said axis, said agitator comprising a member of fixed operating radius, attached members of variable operating radius, and means cooperative between said members to vary the operating radius of said agitator to conform with the contour of said vessel, said vessel having an external flat bottom surface adapted to be disposed in heat transferring contact with the heat absorbing element of said refrigerator.

3. A rectangular tray having a substantially flat interior bottom and upwardly extending angularly positioned sides for use in mechanical refrigerators, and a transversely oscillating agitator pivotally mounted therein and adapted closely to follow the bottom and sides of the tray.

4. A rectangular tray having a substantially flat interior bottom and upwardly extending angularly positioned sides for use in mechanical refrigerators, and an oscillating agitator mounted therein and adapted closely to follow the bottom and sides of the tray, said oscillating agitator comprising a longitudinally disposed pivoted shaft with flexibly connected arms depending therefrom.

5. A rectangular tray having a substantially flat interior bottom and upwardly extending angularly positioned sides for use in mechanical refrigerators, and an oscillating agitator mounted therein and adapted closely to follow the bottom and sides of the tray, said oscillating agitator including a longitudinally disposed pivoted shaft mounted in the upper part of the tray and having flexibly connected arms depending therefrom.

6. A rectangular tray having a substantially flat interior bottom and upwardly extending angularly positioned sides for use in mechanical refrigerators, and an oscillating agitator mounted therein and adapted closely to follow the bottom and sides of the tray, said oscillating agitator including a longitudinally disposed pivoted shaft mounted in the upper part of the tray and having flexibly connected arms depending therefrom, the effective radius of said arms varying as the cross sectional radii of the tray varies.

7. A substantially rectangular tray having a substantially flat interior bottom with upwardly extending angularly positioned sides for use in mechanical refrigerators, and an oscillating agitator pivotally mounted therein said agitator being adapted to swing from side to side and scrape the freezing mixture from the bottom of said tray, said tray having an external flat bottom surface adapted to be disposed in heat transferring contact with the heat absorbing element of said refrigerator.

8. A substantially rectangular tray having a substantially flat interior bottom with upwardly extending arcuate sides for use in mechanical refrigerators, and an oscillating agitator mounted therein and adapted to scrape the bottom and sides of said tray, said oscillating agitator including a longitudinally disposed pivoted shaft mounted in the upper part of said tray and having depending flexible arms, the effective length of which varies as the cross sectional radii of the tray varies.

9. A substantially rectangular tray having a substantially flat interior bottom with upwardly extending arcuate sides for use in a mechanical refrigerator, and a longitudinally disposed pivoted shaft mounted in said tray and blades flexibly supported from said shaft adapted to oscillate transversely in said tray.

10. A substantially rectangular tray having a substantially flat interior bottom with upwardly extending arcuate sides for use in a mechanical refrigerator, and a longitudinally disposed pivoted shaft mounted in said tray and blades flexibly supported from said shaft adapted to oscillate in said tray from side to side, said blades being adapted to coact closely with the bottom and arcuate sides as the agitator oscillates.

11. A substantially rectangular tray having a substantially flat interior bottom with upwardly extending sides for use in a mechanical refrigerator, and a longitudinally disposed pivoted shaft mounted in said tray, agitator blades flexibly connected therewith whereby the effective radii of which may vary as the cross sectional radii of the tray varies, thereby to coact with said bottom and sides while oscillating.

12. A substantially rectangular tray having a substantially flat interior bottom and upwardly extending arcuate sides for use in a mechanical refrigerator, and a longitudinally disposed pivoted shaft mounted in said tray and blades flexibly connected therewith to vary the operating end of said distance between the blades and shaft, the flexible connection permitting a maximum extension substantially equal to that of the radii of the arcuate sides.

13. A substantially rectangular tray having a substantially flat interior bottom and upwardly extending sides for use in a mechanical refrigerator, and a longitudinally disposed pivoted agitator shaft mounted in said tray, flexibly connected arms associated with said shaft and carrying scraper blades at their lower ends adapted to coact with the bottom and sides of said tray, the maximum effective length of said arms when engaging the sides being greater than the varying radii from the shaft to said flat bottom.

14. A substantially rectangular tray having a substantially flat interior bottom with upwardly extending arcuate sides for use in a mechanical refrigerator, and a longitudinally disposed pivoted shaft mounted in said tray and blades flexibly supported from said shaft adapted to oscillate transversely in said tray, and a cover for said tray.

15. A substantially rectangular tray having a flat bottom with upwardly extending arcuate sides for use in a mechanical refrigerator, and a longitudinally disposed shaft mounted in said tray, and blades flexibly supported from said shaft adapted to oscillate in said tray, and a cover for said tray, said cover being adapted to hold the longitudinally disposed shaft in position on said tray.

16. A rectangular tray having a substantially flat interior bottom and upwardly extending sides for use in mechanical refrigerators, and an oscillating agitator mounted therein and adapted closely to follow the bottom and sides of the tray as it oscillates, said oscillating agitator including a longitudinally disposed pivoted shaft mounted in the upper part of the tray and having flexibly connected arms depending therefrom, and a motor for oscillating said shaft, and cause the arms to scrape the bottom and sides as they swing from side to side.

17. A rectangular tray having a substantially flat interior bottom and upwardly extending sides for use in mechanical refrigerators, and an oscillating agitator mounted therein and adapted closely to follow the bottom and sides of the tray, said oscillating agitator including a longitudinally disposed pivoted shaft mounted in the upper part of the tray and having flexibly connected arms depending therefrom, and a motor for oscillating said shaft, said motor being detachably connected with said shaft and the tray upon which it is adapted to be mounted.

18. A rectangular tray having a substantially flat interior bottom and upwardly extending sides for use in mechanical refrigerators, and an oscillating agitator mounted therein and adapted closely to follow the bottom and sides of the tray, said oscillating agitator comprising a longitudinally disposed pivoted shaft with flexibly connected arms depending therefrom, and a motor detachably connected with said tray and shaft adapted to oscillate the latter and to be simultaneously disconnected from both.

19. A rectangular tray having a substantially flat interior bottom and upwardly extending sides for use in mechanical refrigerators, and an oscillating agitator mounted therein and adapted closely to follow the bottom and sides of the tray, said oscillating agitator comprising a longitudinally disposed pivoted shaft with flexibly connected arms depending therefrom, a motor detachably connected with said tray and shaft adapted to oscillate the latter and to be simultaneously disconnected from both, and a cover positioned above said tray and shaft.

20. A vessel for use in a mechanical refrigerator and having a transverse cross-sectional contour of varying radius from a fixed longitudinal axis within its confines and a transversely oscillating agitator pivoted on said axis, said agitator being adapted to substantially conform to the transverse contour of said vessel as it pivotally oscillates within said vessel, said vessel having an external flat bottom surface adapted to be disposed in heat transferring contact with the heat absorbing element of said refrigerator.

21. A vessel for use in a mechanical refrigerator and having bottom and side wall members in angular relation and forming a transverse contour of varying radius from a fixed longitudinal axis within its confines, and an agitator pivoted on said axis and adapted to transversely oscillate in said vessel, said agitator being adapted to substantially conform to and engage the transverse contour of said vessel as it oscillates, said vessel having an external flat bottom surface adapted to be disposed in heat transferring contact with the heat absorbing element of said refrigerator.

22. A horizontally disposed substantially rectangular vessel for use in a mechanical refrigerator and having bottom and side wall members in angular relation and forming a vertical cross-sectional transverse contour of varying radius from a fixed longitudinal axis within its confines, and a transversely oscillating agitator pivoted in said axis, said agitator being adapted to substantially conform to and engage the transverse contour of said vessel as it pivotally oscillates about said axis, said vessel having an external flat bottom surface adapted to be disposed in heat transferring contact with the heat absorbing element of said refrigerator.

WILLIAM W. PARKER.